United States Patent Office 3,654,332
Patented Apr. 4, 1972

---

3,654,332
ORGANOFUNCTIONAL-SILICON MATERIALS
Abe Berger, Schenectady, N.Y., assignor to
General Electric Company
No Drawing. Continuation-in-part of application Ser. No.
691,928, Dec. 20, 1967. This application July 18, 1969,
Ser. No. 843,213
Int. Cl. C07f 7/02
U.S. Cl. 260—448.2 N  9 Claims

ABSTRACT OF THE DISCLOSURE

Certain bis(organofunctional-alkyl)silanes are provided. These materials have the formula:

(1) QQ'SiYY' where Q is an organofunctional radical; Q' is an organofunctional radical or a silalkylene group having an organofunctional radical; Y is a halide substituent; and Y' is a halide substituent or a monovalent hydrocarbon radical, free of aliphatic unsaturation. The materials are useful as glass sizings, fabric stiffeners, metal protectants, and as intermediates for the production of various useful organopolysiloxanes.

CROSS REFERENCES TO RELATED APPLICATIONS

This application is a continuation-in-part of my copending application Ser. No. 691,928, filed Dec. 20, 1967 and now abandoned, and assigned to the same assignee as the present invention. It is also related to my copending application Ser. No. 691,930, filed Dec. 20, 1967, now Pat. No. 3,465,019 and to my copending application Ser. No. 843,214, filed of even date herewith.

BACKGROUND OF THE INVENTION

Organosilicon materials having a variety of organofunctional substituents are known. For example, organosilicon materials substituted with organothio groups are known as useful for metal protectants. Organosilicon materials substituted with haloalkyl substituents are known as useful in glass sizing. An even more useful organosilicon material could be employed if a single silicon atom were substituted with two of these organofunctional groups, either of the same type, or of different types.

SUMMARY OF THE INVENTION

The present invention relates to organosilicon materials substituted with organofunctional groups and having the formula:

(1) QQ'SiYY' where Q is an organofunctional group; Q' is selected from the class consisting of organofunctional groups and silalkylene groups where an organofunctional group is bonded to the silicon atom; Y is a halide substituent; and Y' is selected from the class consisting of halide substituents and monovalent hydrocarbon radicals free of aliphatic unsaturation.

In Formula 1, Q is a monovalent organofunctional radical selected from the class consisting of alkoxyalkyl, fluoroalkoxyalkyl, isocyanatoalkyl, organothioalkyl, $$YCH_2CHCH_2- \text{ and } RSO_2CH_2CH(CH_2)_a-$$
$$\quad\quad | \quad\quad\quad\quad\quad\quad\quad\quad |$$
$$\quad\quad R' \quad\quad\quad\quad\quad\quad\quad\quad R'$$

The substituents represented by Q' include those described for Q and, in addition, a silalkylene substittued with an organofunctional group of the formula:

YY'QSi—R'''— where Q, Y and Y' are as previously defined and R''' is a divalent saturated aliphatic hydrocarbon radical.

In the above formulas, R is a monovalent hydrocarbon radical free of aliphatic unsaturation, and R' is selected from the class consisting of hydrogen and lower alkyl radicals of from 1 to 4 carbon atoms.

The materials of Formula 1 can be formed by the addition of the hydrogen atom of a SiH group across the double bond of an aliphatically unsaturated group, where that aliphatically unsaturated group has within the molecule an organofunctional group, such as the isocyanate, halo, etc. Additionally, the aliphatically unsaturated group can be bonded to another silicon atom so as to form those compounds wherein Q' is a silalkylene group. The reactions are carried out in the presence of various hydrosilylation catalysts. A method for forming the organofunctional-silicon hydride compounds which are employed in the reaction is taught in my copending application Ser. No. 691,930, filed Dec. 20, 1967, and assigned to the same assignee as the present invention.

DESCRIPTION OF THE PREFERRED EMBODIMENTS

In the compounds of the present invention, as defined by Formula 1, the organofunctional substituents represented by Q are selected from the class consisting of alkoxyalkyl, fluoroalkoxyalkyl, isocyanatoalkyl, organothioalkyl, $$YCH_2CHCH_2- \text{ and } RSO_2CH_2CH(CH_2)_a-$$
$$\quad\quad | \quad\quad\quad\quad\quad\quad\quad\quad |$$
$$\quad\quad R' \quad\quad\quad\quad\quad\quad\quad\quad R'$$

The substituents represented by Q' are selected from the same group of materials and, additionally, include silalkylene substituents of formula:

YY'QSi—R'''—

In the above formulas, the radicals included by R are, for example, aryl radicals, such as, phenyl, tolyl, xylyl, naphthyl, etc.; alkyl radicals, such as, methyl, ethyl, propyl, butyl, pentyl; and cycloalkyl radicals, such as, cyclopentyl, cyclohexyl, cycloheptyl, etc. The divalent radicals included within R''' include, for example, ethylene, propylene, 2-methyl ethylene, etc.

Some of the bis(organofunctional-alkyl)silanes included within Formula 1 are, for example, bis-(sulfone)silanes, such as:

$$(CH_3SO_2CH_2CH_2CH_2)_2Si(Cl)_2, (CH_3SO_2CH_2\overset{\overset{\displaystyle CH_3}{|}}{C}HCH_2)_2Si(Cl)_2, \text{etc}$$

bis-(haloalkyl)silanes, such as:

$$(Cl-CH_2CH_2CH_2)_2SiCl_2, (Cl-CH_2CH-CH_2)_2SiCl_2, \text{etc.}$$
$$\quad\quad\quad\quad\quad\quad\quad\quad\quad\quad\quad\quad\quad |$$
$$\quad\quad\quad\quad\quad\quad\quad\quad\quad\quad\quad\quad CH_3$$

bis-(isocyanato)silanes, such as:

$$(OCN-CH_2CH_2CH_2)_2SiCl_2, (OCN-CH_2-\overset{\overset{\displaystyle CH_3}{|}}{C}H-CH_2)_2SiCl_2, \text{etc.}$$

and bis-(organothio)silanes, such as:

$$(CH_3S-CH_2CH_2CH_2)_2SiCl_2$$

$$C_6H_5SCH_2CH_2CH_2)_2SiCl_2$$

$$(CH_3S-CH_2CH_2)_2SiCl_2$$

etc.

These diorganofunctional sileans of Formula 1, such as the bis-(sulfone)silanes can be employed as intermediates for the production of solvent resistant organopolysiloxanes. In addition, the bis-(haloalkyl)silanes can be employed as glass sizing materials, the bis-(isocyanato) silanes can be employed as fabric stiffeners, the bis-(organothio)silanes can be employed as metal protectants, etc.

The compounds of Formula 1, where Q' is an organofunctional substituent, can be formed by the addition of organofunctional-silicon hydrides, the preparation of which is set forth in my copending application Ser. No. 691,930, filed Dec. 20, 1967, to aliphatically unsaturated organofunctional compounds. This preparation involves the use of a hydrosilylation catalyst as shown, for example, in Bluestein U.S. Pat. Nos. 2,971,970; 2,971,971; and 2,971,972, and Lamoreaux U.S. Pat. No. 3,220,972, all assigned to the same assignee as the present invention.

Formation of the compounds of Formula 1 where Q' is defined by the formula:

$$YY'QSi-R'''-$$

can be effected by reaction of organofunctional-silicon hydrides of formula:

(2) $\quad QSiYY'H$ where Q, Y and Y' are as previously defined with an organofunctional-silicon material having an aliphatically unsaturated substituent. This reaction, also, involves the addition of the hydrogen of an SiH group across the double bond of the aliphatic unsaturation and involves the use of the previously referenced hydrosilylation catalysts.

In order that those skilled in the art may be better enabled to practice the present invention, the following examples are given by way of illustration, and not by way of limitation. All parts in the following examples, except as otherwise indicated, are by weight.

Example 1

A mixture comprising 218 parts of trichlorosilyl-propylisocyanate, 66 parts of dodecylsilane, and 10.1 parts of triethylamine was heated for 5 hours at 130° C. The mixture was then fractionated and the product, boiling at 62°–63° C. at 2 mm. pressure, dichlorosilylpropylisocyanate of formula:

(3) $\quad OCNCH_2CH_2CH_2SiHCl_2$ was collected.

To a mixture consisting of 23 parts of allylisocyanate and 340 parts per million of platinum, under an inert atmosphere, was added 50 parts of the dichlorosilylpropylisocyanate at a temperature of 80° C. The temperature of the reaction mixture rose to 95° C., and was maintained between 80° C. and 95° C. until completion of the addition. The mixture was then held at 95° C. for an additional 2 hours and was fractionated, collecting the product boiling at 132°–133° C. at 0.25 mm. Based upon the method of preparation, the product was bis(isocyanatopropyl)dichlorosilane of formula:

(4) $\quad (OCNCH_2CH_2CH_2)_2SiCl_2$

The structure of this product was substantiated by its infrared spectrum. The product was recovered in a 70% yield, based upon the starting dichlorosilylpropylisocyanate.

Example 2

To a mixture of 8.3 parts of allylisocyanate and 23 parts per million, based upon the isocyanate, of platinum, held under a nitrogen atmosphere, was added 17.7 parts of gamma-chloropropyldichlorosilane. A vapor phase chromatograph of the reaction mixture showed completion of reaction one hour after completion of addition. The mixture was fractionally distilled and the product, boiling at 138° C. at 6 mm., was collected. Based upon the method of preparation the product was gamma-chloropropyl, gamma-isocyanatopropyldichlorosilane of formula:

(5) $\quad ClCH_2CH_2CH_2Si(Cl_2)CH_2CH_2CH_2NCO$

The structure of the product was substantiated by its infrared spectrum. The yield of the product was 75%, based upon the starting gamma-chloropropyldichlorosilane.

Example 3

To a mixture, at room temperature, of 11.5 parts of 2',2',2' - trifluoroethoxyethyldichlorosilane and 10.2 parts per million of platinum, was added 7 parts of 2',2',2'-trifluoroethoxyethylene. During the addition the temperature rose to 85° C. and this temperature was maintained for approximately 2 hours. A vapor phase chromatography scan run after this time showed complete consumption of the starting materials. The mixture was then fractionally distilled and the product boiling at 93°–94° C. at 3 mm. was collected. Based upon its method of preparation, the product was bis-(2',2',2'-trifluoroethoxyethyl)dichlorosilane of formula:

(6) $\quad (CF_3CH_2OCH_2CH_2)_2SiCl_2$

The structure of this product was substantiated by its infrared spectrum and the amount collected represented a 40% yield based upon the starting 2',2',2'-trifluoroethoxyethyldichlorosilane.

Example 4

A mixture of 125 parts of propionoxypropyltrichlorosilane, 34 parts of dodecylsilane, and 10 parts of tributylamine was heated at 130° C. for 5 hours under an inert atmosphere. The mixture was then fractionally distilled and the product, propionoxypropyldichlorosilane was obtained.

To a mixture of 18.6 parts of allylacetate and 60 parts per million of platinum, based upon the allylacetate, held under an inert atmosphere at 100° C., was added 40 parts of the propionoxypropyldichlorosilane. The temperature of the reaction mixture was maintained at 100° C. by controlling the rate of addition. After completion of the addition, the mixture was heated for approximately 3 additional hours at 120° C. and the mixture was then fractionated to obtain the product boiling at 141°–142° C. at 0.5 mm. Based upon the method of preparation, the product was propionoxypropylacetoxypropyldichlorosilane of formula:

(7) $\quad CH_3CH_2COOCH_2CH_2CH_2Si(Cl_2)CH_2CH_2CH_2OOCCH_3$

The structure of this product was substantiated by its infrared spectrum and it was obtained in a yield of 60%, based upon the starting propionoxypropyldichlorosilane.

Example 5

A mixture comprising 2 moles of chloropropyltrichlorosilane, 1 mole of hexylsilane, and 7 mole percent, based upon the total reactants, of tributylamine, was heated at 130° C. for a period of 3 hours. The mixture was then fractionated and the gamma-chloropropyldichlorosilane, boiling at 42°–46° C. at 60 mm., was collected, having the formula:

(8) $\quad ClCH_2CH_2CH_2SiHCl_3$

To a mixture of 7.6 parts of allylchloride and 38.3 parts per million of platinum, based upon the allylchloride, held under an inert atmosphere, was added 17.7 parts of the chloropropyldichlorosilane. A vigorous reaction resulted and the temperature of this reaction was moderated by controlling the rate of addition of the silane. The mixture was then fractionally distilled and the product recovered at a boiling point of 86°–88° C. at 2 mm. Based upon the method of preparation, the product was bis-(chloropropyl)dichlorosilane of formula:

(9) $\quad (ClCH_2CH_2CH_2)_2SiCl_2$

The product was subjected to elemental analysis for $SiC_6Cl_4H_{12}$ and was found to contain 10.74% silicon and 4.95% hydrogen, comparing very favorably with the theoretical of 11.02% silicon and 4.95% hydrogen. Additionally, the compound showed 27.90% hydrolyzable chlorine, compared with the theoretical amount of 27.90%.

Example 6

A mixture of about 3 moles of 2-methyl-3-chloropropyltrichlorosilane, 1 mole of octadecylsilane, and 8 mole percent, based upon the total of the reactants, of tri-n-butylamine, was heated under a nitrogen atomsphere for 5 hours at 120° C. The mixture was then fractionally distilled and the product, 2-methyl-3-chloropropyldichlorosilane, boiling at 46°–55° C. at 4.6 mm. was collected. The product had the formula:

(10)      ClCH₂CHCH₂SiHCl₂
                |
                CH₃

To a mixture comprising 13.9 parts of 2-methallyl-chloride and 50 parts per million of platinum, based on the allyl compound, was added 29.4 parts of 2-methyl-chloropropyldichlorosilane. The platinum was in the form of a complex of chloroplatinic acid and butanol. The addition of the silane was carried out under an inert nitrogen atmosphere, with the methallyl chloride at reflux. After 3 hours, an additional 9.05 parts of 2-methallyl-chloride, along with 20 parts per million of platinum, was added to the reaction mixture. The mixture was maintained at a temperature of about 80° C. for an additional 4 hours and was then fractionally distilled. The product boiling at 125°–126° C. at 1.9 mm. was collected. Based upon the method of preparation, the product was bis-(2-methylchloropropyl)dichlorosilane of formula:

(11)      (ClCH₂CHCH₂)₂SiCl₂
                 |
                CH₃

The product was analyzed for hydrolyzable chloride and was found to contain 24.52%, comparing well with the theoretical of 25.13%.

Example 7

To a mixture comprising 1 mole of gamma-chloropropyl-vinyldichlorosilane and 50 parts per million, by weight, of platinum, was added 1 mole of gamma-chloropropyl-dichlorosilane. An exothermic reaction occurred and the reaction mixture was maintained at reflux for approximately 2 hours. The mixture was then fractionally distilled with the product collected having the formula:

(12) ClCH₂CH₂CH₂Si(Cl₂)C₂H₄Si(Cl₂)CH₂CH₂CH₂Cl

The foregoing examples thus show a representative number of bis-(organofunctional)silanes of Formula 1 and bis-silalkylenes of the same formula, also having two organofunctional substituents. Such materials are useful, as previously pointed out, in solvent resistant organopolysiloxanes, as glass sizings, as metal protectants, etc.

What I claim as new and desire to secure by Letters Patent of the United States is:

1. An organofunctional-silicon material of formula:

QQ'SiYY' where Q is an organofunctional radical selected from the class consisting of alkoxyalkylene, fluoroalkoxyalkylene, isocyanatoalkylene, lower alkylthioalkylene where the akyl group may be of 1 to 6 carbon atoms, phenylthioalkylene YCH₂CHCH₂— and RSO₂CH₂CH(CH₂)a—
                                        |
                                        R'

Q' is selected from the class consisting of Q and YY'QSi—R'''—; Y is a halide substituent; Y' is selected from the class consisting of Y and monovalent hydrocarbon radicals free of aliphatic unsaturation; R is a monovalent hydrocarbon radical free of aliphatic unsaturation; R' is selected from the class consisting of hydrogen and lower alkyl radicals of from 1 to 4 carbon atoms; R''' is a divalent saturated aliphatic hydrocarbon radical; and a is an integer of from 1 to 5.

2. The organofunctional-silicon material of claim 1 where Q' is selected from the class consisting of alkoxyalkylene, fluoroalkoxyalkylene, isocyanatoalkylene, lower alkylthioalkylene where the alkyl group may be of 1 to 6 carbon atoms and phenylthioalkylene, YCH₂CHCH₂— and RSO₂CH₂CH(CH₂)a—
                                        |
                                        R'

3. The organofunctional-silicon material of claim 2 having the formula:

(OCNCH₂CH₂CH₂)₂SiCl₂

4. The organofunctional-silicon material of claim 2 having the formula:

(CF₃CH₂OCH₂CH₂)₂SiCl₂

5. The organofunctional-silicon material of claim 2 having the formula:

CH₃CH₂COOCH₂CH₂CH₂Si(Cl₂)CH₂CH₂CH₂OOCCH₃

6. The organofunctional-silicon material of claim 2 having the formula:

(ClCH₂CH₂CH₂)₂SiCl₂

7. The organofunctional-silicon material of claim 2 having the formula:

(ClCH₂CHCH₂)₂SiCl₂
           |
           CH₃

8. The organofunctional-silicon material of claim 1 wherein Q' is:

YY'QSi—R'''—

9. The organofunctional-silicon material of claim 8 having the formula:

ClCH₂CH₂CH₂Si(Cl₂)C₂H₄Si(Cl₂)CH₂CH₂CH₂Cl

References Cited

UNITED STATES PATENTS 3,441,585    4/1969    Brown            260—448.2
3,478,077    11/1969    Wu               260—448.2

TOBIAS E. LEVOW, Primary Examiner

W. F. W. BELLAMY, Assistant Examiner

U.S. Cl. X.R.

117—135.1